US008259974B2

(12) United States Patent
Petrausch

(10) Patent No.: US 8,259,974 B2
(45) Date of Patent: Sep. 4, 2012

(54) CONFIGURATION AND METHOD FOR DETECTING FEEDBACK IN HEARING DEVICES

(75) Inventor: Stefan Petrausch, Erlangen (DE)

(73) Assignee: Siemens Medical Instruments Pte. Ltd, Singapore (SG)

( * ) Notice: Subject to any disclaimer, the term of this patent is extended or adjusted under 35 U.S.C. 154(b) by 320 days.

(21) Appl. No.: 12/728,358

(22) Filed: Mar. 22, 2010

(65) Prior Publication Data

US 2010/0260365 A1 Oct. 14, 2010

(30) Foreign Application Priority Data

Apr. 8, 2009 (DE) ........................ 10 2009 016 845

(51) Int. Cl.
*H04R 25/00* (2006.01)
*H04B 15/00* (2006.01)

(52) U.S. Cl. .......................... 381/318; 381/312; 381/93

(58) Field of Classification Search ................. 381/318, 381/312, 93, 314, 321, 328
See application file for complete search history.

(56) References Cited

U.S. PATENT DOCUMENTS

| | | | | |
|---|---|---|---|---|
| 6,134,329 | A * | 10/2000 | Gao et al. | 381/60 |
| 6,404,895 | B1 | 6/2002 | Weidner | |
| 7,024,011 | B1 | 4/2006 | Hamacher et al. | |
| 7,319,770 | B2 * | 1/2008 | Roeck et al. | 381/321 |
| 2006/0093173 | A1 | 5/2006 | Hamacher et al. | |
| 2009/0041272 | A1 * | 2/2009 | Puder et al. | 381/318 |
| 2010/0092004 | A1 * | 4/2010 | Kuze | 381/71.11 |

FOREIGN PATENT DOCUMENTS

| | | | |
|---|---|---|---|
| DE | 199 04 538 | C1 | 7/2000 |
| EP | 1 052 881 | A2 | 11/2000 |
| EP | 1 648 197 | A2 | 4/2006 |

* cited by examiner

*Primary Examiner* — Mohamad Musleh
*Assistant Examiner* — Mangtin Lian
(74) *Attorney, Agent, or Firm* — Laurence A. Greenberg; Werner H. Stemer; Ralph E. Locher

(57) ABSTRACT

A configuration and associated methods are used for detecting acoustic feedback in a hearing device. One embodiment contains a first feedback detection unit, which determines the probability of feedback, a second feedback detection unit, which determines a weighting factor, and an arithmetic unit, which multiplies the feedback probability by the weighting factor. As an alternative to determining the weighting factor, a threshold value may also be controlled. This offers the advantage of improved acoustic feedback detection by a combination of two different feedback detection methods.

11 Claims, 4 Drawing Sheets

CONFIGURATION AND METHOD FOR DETECTING FEEDBACK IN HEARING DEVICES

CROSS-REFERENCE TO RELATED APPLICATION

This application claims the priority, under 35 U.S.C. §119, of German application DE 10 2009 016 845.1, filed Apr. 8, 2009; the prior application is herewith incorporated by reference in its entirety.

BACKGROUND OF THE INVENTION

Field of the Invention

The invention relates to configurations and methods for improved detection of feedback in hearing devices.

A frequent problem with hearing devices is acoustic feedback between an output of the hearing device and an input, which manifests itself as an annoying feedback whistle. FIG. 1 illustrates the principle of acoustic feedback using the example of a hearing device 1. The hearing device 1 contains a microphone 2, which receives a useful acoustic signal 10, converts it into an electrical microphone signal 11, and outputs it to a signal processing unit 3. The microphone signal 11 is processed and amplified inter alia in the signal processing unit 3, and output as an earphone signal 12 to an earphone 4. The electrical earphone signal 12 is converted back into an acoustic output signal 13 in the earphone 4 and output to an eardrum 7 of a hearing device wearer.

The problem now consists wherein a part of the acoustic output signal 13, going via an acoustic feedback path 14, reaches the input of the hearing device 1, where it is superimposed on the useful signal 10 and received by the microphone 2 as a composite signal. If the phasing and amplitude of the output signal feedback is at the appropriate level, an annoying feedback whistle occurs. Acoustic feedback is particularly poorly attenuated through open-fit hearing devices, as a result of which the problem intensifies.

To solve the problem, adaptive systems for feedback suppression, wherein the acoustic feedback path 14 is digitally simulated, have been available for some time. The simulation is carried out, for example, by an adaptive compensation filter 5, which is fed by the earphone signal 12. After the filtering in the compensation filter 5 a filtered signal 15 is subtracted from the microphone signal 11. In the ideal case this eliminates the effect of the acoustic feedback path 14.

For effective feedback suppression, it is necessary for the adjustment of the filter coefficients of the adaptive compensation filter 5 to be controlled. This is done by means of the so-called increment. It indicates the speed with which the adaptive compensation filter 5 adapts to the acoustic feedback path 14. Since there is no useful compromise for a permanently set increment, the latter must be adapted to the currently prevailing acoustic situation. A large increment is always desirable in order to achieve rapid adaptation of the filter coefficients to the acoustic feedback path 14. The disadvantage of large increments, however, is the generation of perceptible signal artifacts.

For a largely subcritical feedback scenario, on the other hand, the increment should be vanishingly small. If a critical feedback situation occurs, however, the increment should be large. This ensures that the filter coefficients of the compensation filter 5 are modified only if the transmission characteristic of the latter differs significantly from the characteristic of the acoustic feedback path 14, i.e. if a subsequent adjustment is required. For control of the increment, a feedback detection unit 6 is required which detects feedback from the microphone signal 11, or at least roughly estimates the probability or the extent of the presence of feedback on the microphone 2.

A number of solutions are available for controlling the increment or for controlling feedback suppression in general. When choosing a suitable solution it us largely necessary to reach a balance between speed and accuracy of detection. Examples of solutions are:

a) Level comparisons: if sinusoidal signals (peaks in the spectrum) are found at higher frequencies, then the feedback whistle may be assumed. This solution is simple and quick, but often highly inaccurate.

b) Tonality detection: the tonality level of a signal is detected, wherein the presence of the feedback whistle may again be concluded at higher frequencies. This solution is somewhat more precise than simple observation of levels, but is also somewhat slower.

c) Detection of a phase modulation: an inaudible phase modulation which can be detected on the microphone is superimposed on the output signal. This solution is highly accurate, but slow.

When choosing a suitable solution it is necessary to reach a balance between detection accuracy and detection speed. If the feedback detection is fast, or if it is set to fast, then the error detection rate often rises significantly.

SUMMARY OF THE INVENTION

It is accordingly an object of the invention to provide a configuration and a method for detecting feedback in hearing devices which overcome the above-mentioned disadvantages of the prior art methods and devices of this general type, which facilitate reliable and rapid feedback detection in hearing devices.

A configuration for detecting acoustic feedback in a hearing device has a first feedback detection unit which receives a microphone signal from the hearing device and which determines the probability of feedback. The configuration further has at least one second feedback detection unit which receives the microphone signal from the hearing device and determines a weighting factor between "1" indicating the definite presence of feedback and "0" indicating the definite absence of feedback. An arithmetic unit is provided for calculating the feedback probability using the weighting factor, and a comparison unit is provided for comparing the feedback probability calculated using the weighting factor with a predefinable threshold value and signals when the threshold value is exceeded. The advantage of this, for example, is that feedback suppression may be optimized in hearing devices and that feedback detection may be adapted to the characteristics and habits of a hearing device wearer.

In a development of the invention the arithmetic unit can multiply the feedback probability by the weighting factor.

The invention also claims a configuration for detecting acoustic feedback in a hearing device having a first feedback detection unit which receives a microphone signal from the hearing device and which determines a feedback probability, and a second feedback detection unit which receives the microphone signal from the hearing device and which controls a threshold value depending on the occurrence of feedback. A comparison unit is provided for comparing the feedback probability with the threshold value and signals when the threshold value is exceeded.

In a development the configuration may incorporate a linking unit, which links a feedback detection signal of the second feedback detection unit with the signal which indicates that the threshold value is exceeded.

In a development, acoustic feedback may be detected in different predefinable frequency bands.

In a further embodiment, the first and second feedback detection units may have different feedback detection algorithms.

The invention also claims a hearing device having at least one microphone, at least one earphone and the inventive configuration.

The invention moreover claims a method for detecting feedback in hearing devices. The method includes the steps of determining feedback probability via a first feedback detection unit which receives a microphone signal from the hearing device, and determining a weighting factor between "1", indicating the definite presence of feedback, and "0", indicating the definite absence of feedback, via a second feedback detection unit which receives the microphone signal from the hearing device. The feedback probability is calculated using the weighting factor, and a signal is generated when the feedback probability calculated using the weighting factor exceeds a predefinable threshold value.

The invention offers the advantage of improving acoustic feedback detection by a combination of two different feedback detection methods.

In a development of the method the calculation may be performed by multiplication.

The invention also claims a method for detecting feedback in hearing devices, having the following steps: determining feedback probability by means of a first feedback detection unit which receives a microphone signal from the hearing device, controlling a threshold value, depending on the occurrence of feedback, via a second feedback detection unit which receives the microphone signal from the hearing device, and signaling when the feedback measurement exceeds the controlled threshold value.

The method may also include the following additional step of linking of a feedback detection signal from the second feedback detection unit with the signaling.

In a development of the method, acoustic feedback may be detected in different predefinable frequency bands.

The algorithms for detecting feedback may be executed differently in the first and second feedback detection units.

Other features which are considered as characteristic for the invention are set forth in the appended claims.

Although the invention is illustrated and described herein as embodied in a configuration and a method for detecting feedback in hearing devices, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
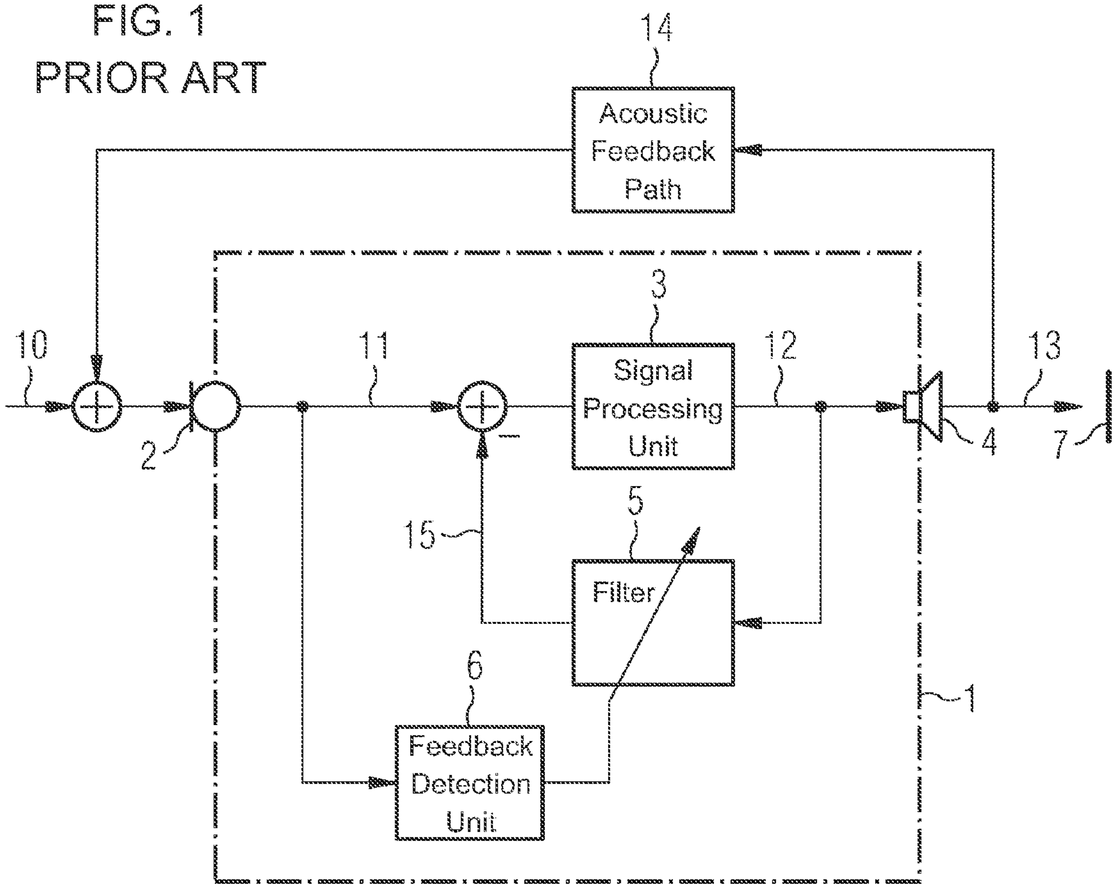
FIG. 1 PRIOR ART
FIG. 1 is a block diagram showing a hearing device with feedback suppression according to the prior art.
Figure 2:
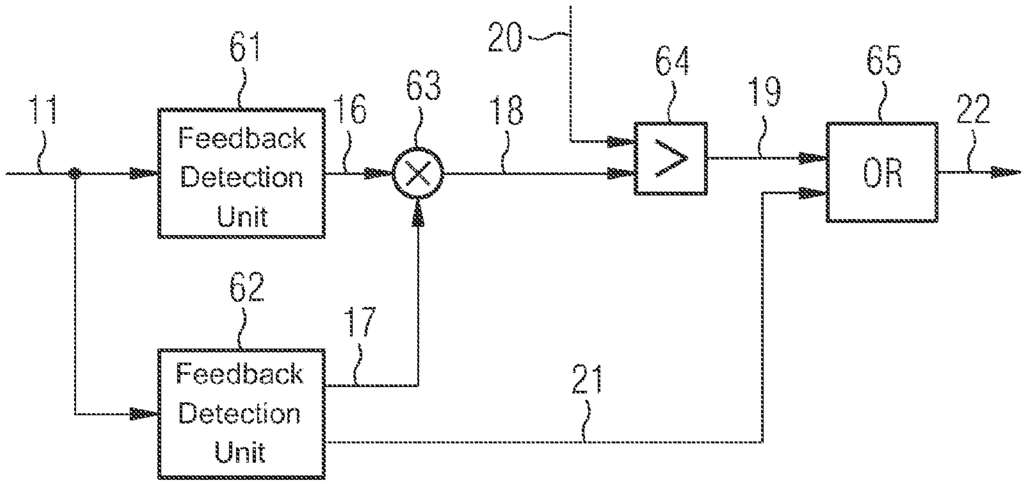
FIG. 2 is a block circuit diagram showing a feedback detection unit with a weighting factor according to the invention.

Referring now to the figures of the drawing in detail and first, particularly, to FIG. 2 thereof, there is shown a block diagram showing an inventive configuration for detecting feedback. A microphone signal 11 is fed both to a first and to a second feedback detection unit 61, 62. A fast but error-prone detection algorithm is executed in the first feedback detection unit 61, for example by detecting sinusoidal peaks in level at high frequencies. A slow but highly accurate and reliable detection algorithm is executed in the second feedback detection unit 62, for example by detecting a phase-modulated feedback signal. In the first feedback detection unit 61, a feedback probability 16 is determined as the feedback measurement, which may assume a value between "0" and "1". "1" means highly probable and "0" means highly improbable. In the second feedback detection unit 62 a weighting factor 17 is determined, which likewise may be between "0" and "1", wherein "1" signals the definite presence of feedback and "0" the definite absence of feedback.

The feedback probability 16 is now multiplied by the weighting factor 17 thus determined, in a multiplier 63 which is used as an arithmetic unit, and the output signal 18 is fed to a comparison unit 64. A standardized threshold value 20 is likewise fed to an input of the comparison unit 64. The output signal 19 of the comparison unit 64 now signals whether the output signal 18 of the multiplier 63 is greater than the threshold value 20. If so, this is signaled by a logical "1" in the output signal 19 of the comparison unit 64.

The output signal 19 of the comparison unit 64 is then fed to an input of an OR gate 65. A feedback detection signal 21 from the second feedback detection unit 62, which is signaled by a logical "1" if feedback is definitely detected, is fed to a further input of the OR gate 65. The OR gate 65 emits a feedback detection signal 22 at its output, which is logically "1" if either the comparison signal 19 of the comparison unit 64 or the feedback detection signal 21 of the second feedback detection unit 62 is logically "1", i.e. if feedback is detected in at least one of the two detection branches.

Alternatively, the threshold value 20 may be controlled. This inventive solution is illustrated in the block diagram shown in FIG. 3. A microphone signal 11 is again fed to a first and to a second feedback detection unit 61, 62. A fast but error-prone detection algorithm is executed in the first feedback detection unit 61, and a slow but highly accurate and reliable detection algorithm is executed in the second feedback detection unit 62. In the first feedback detection unit 61, a feedback probability 16 is determined which may assume a value between "0" and "1". "1" means highly probable and "0" means highly improbable. In the second feedback detection unit 62, a predefined threshold value is controlled so that it may be between "0" and "1", wherein—in contrast to FIG. 2—a "0" signals the definite presence of feedback and a "1" signals the definite absence of feedback.

The threshold value 20 thus controlled is now fed to a comparison unit 64. The feedback probability 16 is likewise fed to an input of the comparison unit 64. The output signal 19 of the comparison unit 64 then signals whether the feedback probability 16 is greater than the threshold value 20. If so, this is signaled by a logical "1" in the output signal 19 of the comparison unit 64.

The output signal 19 of the comparison unit 64 is now fed to an input of an OR gate 65, as in FIG. 2. A feedback detection signal 21 of the second feedback detection unit 62, which signals—with a logical "1"—that a feedback has definitely been detected, is fed to a further input of the OR gate 65. The OR gate 65 emits a feedback detection signal 22 on its output, which is logically "1" if either the comparison signal 19 of the comparison unit 64 or the feedback detection signal 21 of the second feedback detection unit 62 is logically "1", i.e. if feedback is detected in at least one of the two detection branches.

Figure 4:
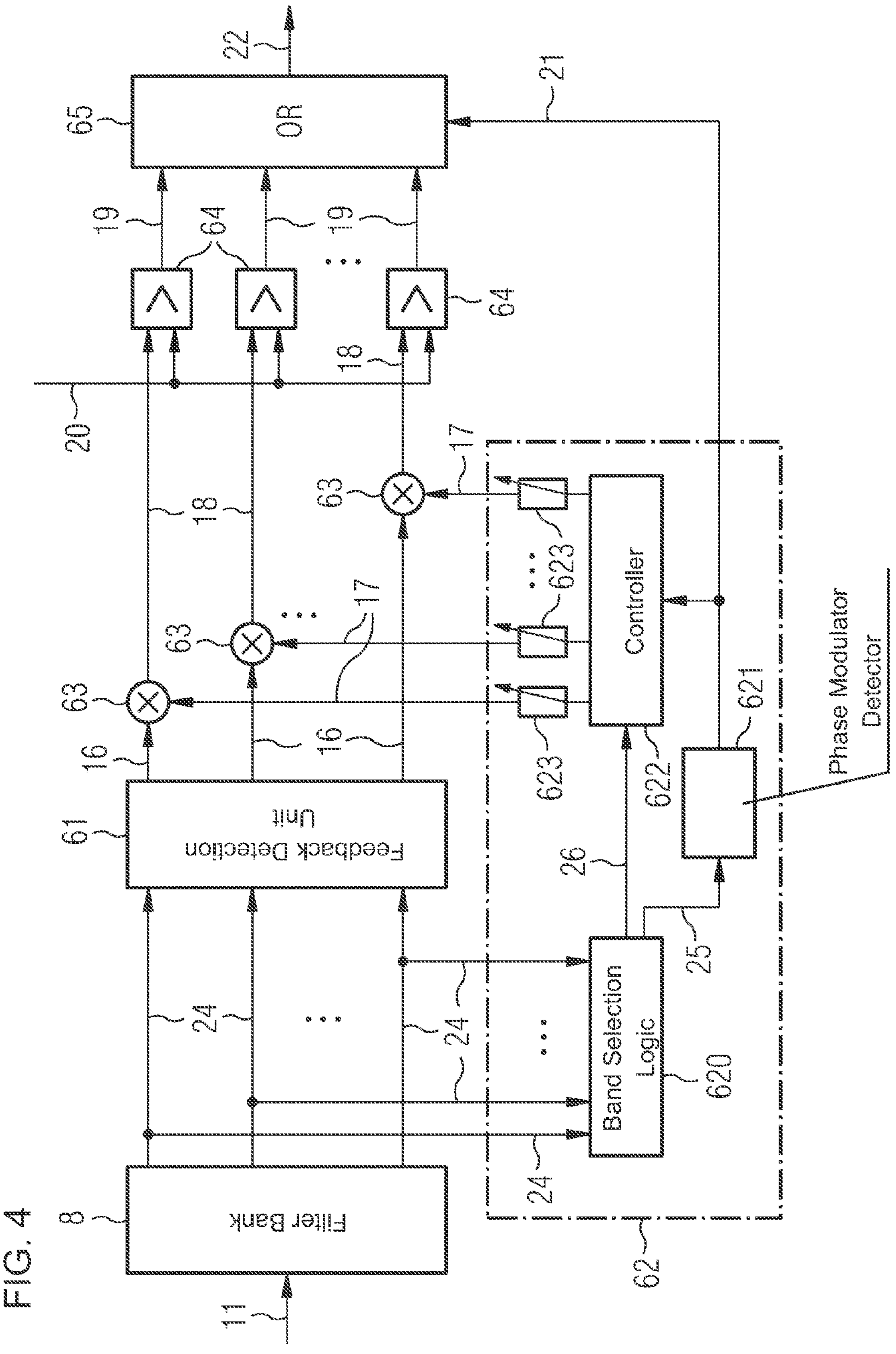
FIG. 4 is a block diagram showing the inventive feedback detection unit with weighting factors.

FIG. 4 shows the principle illustrated in FIG. 2 in a practical implementation on the basis of a block diagram. A microphone signal 11 of a hearing device is separated into n frequency bands 24 by a filter bank 8. The n bands 24 are fed both to the inputs of a fast first feedback detection unit 61 and to a slower, but accurate second feedback detection unit 62 with a phase modulation detector 621. For the rapid detection unit 61, various methods are available for delivering the n output signal 16 with values between zero and one. The output signals 16 indicate the feedback probabilities for the n frequency bands 24.

The phase modulation detector 621 of the second feedback detection unit 62 detects whether a phase modulation, which is superimposed on an output signal of the hearing device, is contained in the microphone signal 11. Since the detection is time-consuming, it is only carried out for a frequency band 25 that has been selected by a band selection logic 620. The detection 21 of the phase modulation, which normally takes some time, must now be available—simultaneously with a band index 26 which indicates the frequency band 24 in which the phase modulation was detected—to a control 622, 623 of n weighting factors 17. The n weighting factors 17 may assume values between zero and one.

A simple algorithm which ensures that the sum of all weighting factors 17 remains constant is used—for example—as the controller 622, 623 of n weighting factors 1. The n weighting factors 17 thus determined are multiplied by the feedback probability 16 in n multipliers 63 and then compared, as multiplied signals 18, with a predefinable threshold 20 in comparison units 64 for each frequency band. If the feedback probability 16 is greater than the threshold value 20, a logical "1" is output as the output signal 19 on the comparison unit 64.

All output signals 19 of the comparison units 64 are then linked with a feedback detection signal 21 of the phase detector 621 in an OR gate 65. Feedback 22 thus occurs if one of the weighted n feedback probabilities 18 exceeds the threshold value 20, or if the detection 21 of the phase modulation indicates feedback.

The control of the weighting factors 17 may have the following characteristics:

a) The sum of the n weighting factors 17 or of the root mean square value thereof remains constant, in order to maintain the absolute sensitivity of the first feedback detection unit 61.

b) The n weighting factors 17 are reset to a "factory setting" every time the hearing device is switched on, since the feedback behavior of the hearing device may vary daily, for example due to a different sitting position or a slight change in hairstyle.

c) The sum of the n weighting factors 17 or of the root mean square value thereof adjusts to the frequency of reliable detection of feedback on the second feedback detection unit 62, in order to compensate for unstable feedback behavior.

Figure 3:
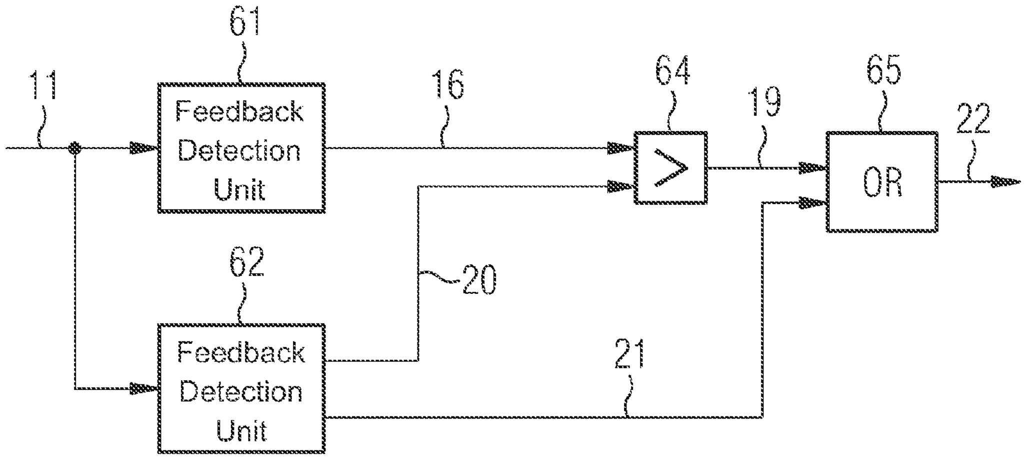
FIG. 3 is a block circuit diagram showing the inventive feedback detection unit with threshold value control.
Figure 5:
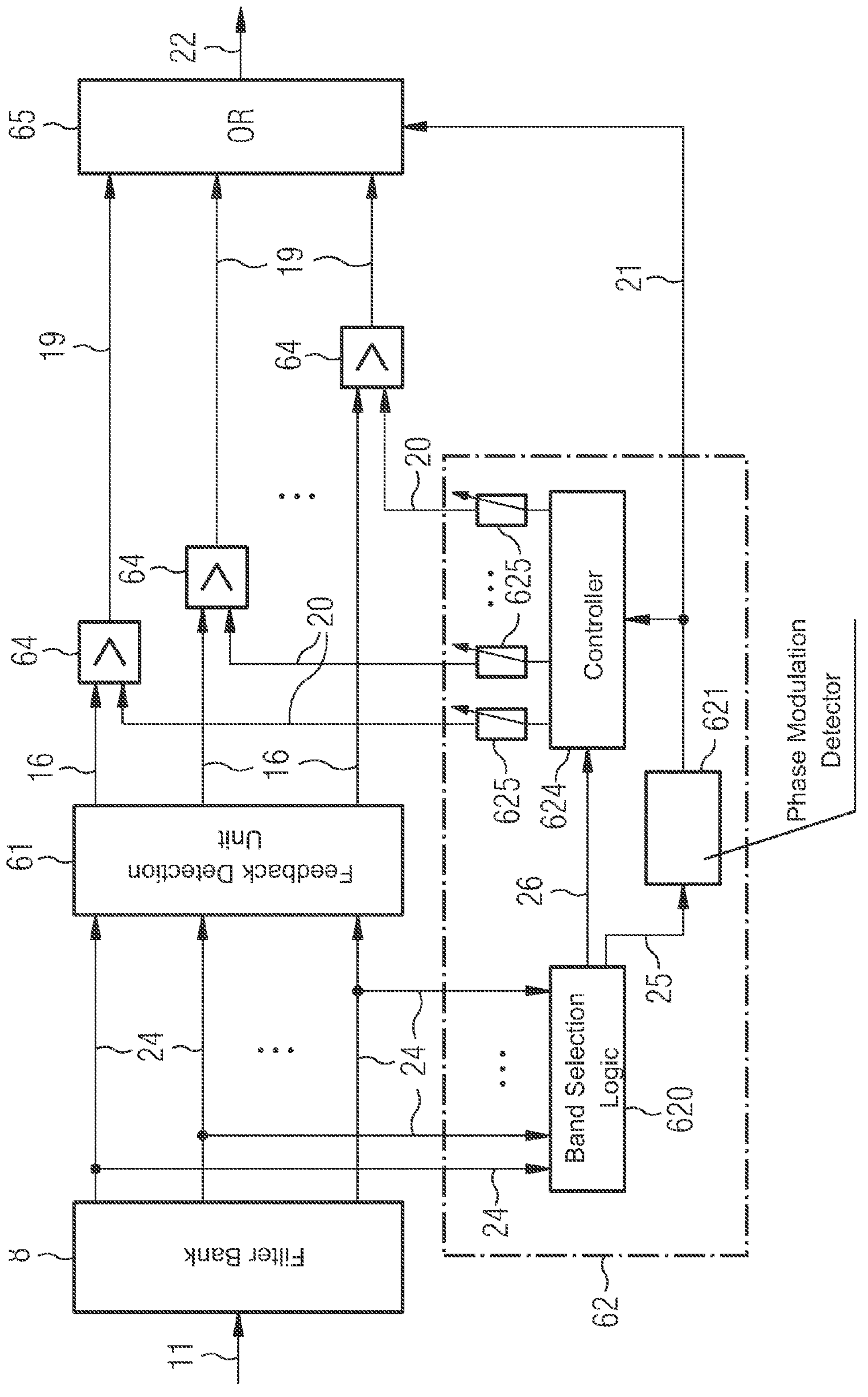
FIG. 5 is a block diagram showing the inventive feedback detection unit with threshold value control.

FIG. 5 shows the principle described in FIG. 3 in a practical implementation on the basis of a block diagram. A microphone signal 11 of a hearing device is separated into n frequency bands 24 by a filter bank 8. The n bands 24 are fed both to the inputs of a fast first feedback detection unit 61 and to a slower, but accurate second feedback detection unit 62 with a phase modulation detector 621. For the rapid detection unit 61, various methods are available in which n output signals 16 may assume values between zero and one. The values are a measure of the probability of feedback.

In the second feedback detection unit 62 the detector 621 detects, for phase modulations, whether a phase modulation superimposed on an output signal, for example on an earphone signal of a hearing device, is detected again at an input, for example a microphone of the hearing device. Since the detection is very time-consuming, it is only carried out for a single frequency band 25, which is selected by band selection logic 620. The detection 21 of the phase modulation, which normally takes some time, is available simultaneously with a band index 26 which indicates the frequency band in which the phase modulation was detected, to a control 624, 625 of n band-specific threshold values 20. The n threshold values 20 are between zero and one, wherein a low threshold value 20 means a high probability of feedback.

A simple algorithm which ensures that the sum of all threshold values 20 remains constant is used—for example—as the controller 624, 625 of the n threshold values 20. The n threshold values 20 thus determined are compared with the n feedback probabilities 16 in n comparison units 64.

All n output signals 19 in the comparison units 64 are then linked with the feedback detection signal 21 of the phase detector 621 in an OR gate 65. Feedback is thus indicated if one of the n feedback probabilities 16 exceeds the corresponding threshold value 20, or if the phase modulation detector 621 has detected feedback.

The control of threshold values may have the following characteristics:

a) The sum of the threshold values 20 or of the root mean square value thereof remains constant, in order to maintain the absolute sensitivity of the rapid detection.

b) The threshold values 20 are reset to a "factory setting" every time the hearing device is switched on, since the feedback behavior of the hearing device may vary daily, for example due to a different sitting position or a slight change in hairstyle.

c) The sum of the threshold values 20 or of the root mean square value thereof adjusts to the frequency of reliable detection of feedback by the second feedback detection unit 62, in order to compensate for unstable feedback behavior.

The threshold values 20 may be controlled, for example by multiplication with determined weighting factors.

The invention claimed is:

1. A configuration for detecting acoustic feedback in a hearing device, the configuration comprising:

a first feedback detection unit for receiving a microphone signal from the hearing device and determines a feedback probability;

at least one second feedback detection unit for receiving the microphone signal from the hearing device and determines a weighting factor between "1" indicating a definite presence of feedback and "0" indicating a definite absence of feedback;

an arithmetic unit calculating the feedback probability using the weighting factor; and a comparison unit comparing the feedback probability calculated using the weighting factor with a predefinable threshold value and outputs a signal when the predefined threshold value is exceeded.

2. The configuration according to claim 1, wherein said arithmetic unit multiplies the feedback probability by the weighting factor.

3. The configuration according to claim 1, further comprising a linking unit for linking a feedback detection signal output from said second feedback detection unit with the signal which signals that the threshold value is exceeded.

4. The configuration according to claim 1, wherein the acoustic feedback is detected in different predefinable frequency bands.

5. The configuration according to claim 1, wherein said first and second feedback detection units have different feedback detection algorithms.

6. A hearing device, comprising:

at least one microphone outputting a microphone signal;

at least one earphone;

a configuration for detecting acoustic feedback in the hearing device, the configuration containing:

a first feedback detection unit for receiving the microphone signal from said microphone and determines a feedback probability;

at least one second feedback detection unit for receiving the microphone signal from said microphone and determines a weighting factor between "1" indicating a definite presence of feedback and "0" indicating a definite absence of feedback;

an arithmetic unit calculating the feedback probability using the weighting factor; and a comparison unit comparing the feedback probability calculated using the weighting factor with a predefinable threshold value and outputs a signal when the predefined threshold value is exceeded.

7. A method for detecting feedback in a hearing device, which comprises the steps of:

detecting a feedback probability via a first feedback detection unit receiving a microphone signal from the hearing device;

determining a weighting factor, which is between "1" indicating a definite presence of feedback and "0" indicating a definite absence of feedback, by a second feedback detection unit which receives the microphone signal from the hearing device;

calculating the feedback probability by means of the weighting factor; and generating a signal if the feedback probability calculated using the weighting factor exceeds a predefinable threshold value.

8. The method according to claim 7, which further comprises performing the calculating step via multiplication.

9. The method according to claim 7, which further comprises linking a feedback detection signal from the second feedback detection unit with the signal generated.

10. The method according to claim 7, which further comprises detecting acoustic feedback in different predefinable frequency bands.

11. The method according to claim 7, which further comprises operating the first and second feedback detection units with different feedback detection algorithms.

* * * * *